(12) United States Patent
Akaya et al.

(10) Patent No.: US 8,430,647 B2
(45) Date of Patent: Apr. 30, 2013

(54) COMPRESSOR SAFETY VALVE

(75) Inventors: Yuki Akaya, Aichi (JP); Kazuhide Watanabe, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 115 days.

(21) Appl. No.: 12/921,642

(22) PCT Filed: Jul. 7, 2009

(86) PCT No.: PCT/JP2009/062342
§ 371 (c)(1),
(2), (4) Date: Sep. 9, 2010

(87) PCT Pub. No.: WO2010/024044
PCT Pub. Date: Mar. 4, 2010

(65) Prior Publication Data
US 2011/0174396 A1 Jul. 21, 2011

(30) Foreign Application Priority Data
Aug. 27, 2008 (JP) .................... 2008-218603

(51) Int. Cl.
F04B 49/00 (2006.01)
F16K 15/00 (2006.01)
F16K 17/04 (2006.01)

(52) U.S. Cl.
USPC ............ 417/311; 417/440; 417/454; 137/467

(58) Field of Classification Search .................. 417/310, 417/311, 440, 454, 307; 137/467
See application file for complete search history.

(56) References Cited

U.S. PATENT DOCUMENTS

| | | | | |
|---|---|---|---|---|
| 2,840,103 A | * | 6/1958 | Gerhardt | 137/467 |
| 5,794,915 A | * | 8/1998 | Shimizu et al. | 251/127 |
| 5,913,664 A | * | 6/1999 | Shimizu et al. | 417/307 |
| 2002/0146328 A1 | * | 10/2002 | Yokomachi et al. | 417/307 |

FOREIGN PATENT DOCUMENTS

| | | |
|---|---|---|
| JP | 58-96170 U | 6/1983 |
| JP | 4-138173 U | 12/1992 |
| JP | 09-166081 A | 6/1997 |
| JP | 09-178014 A | 7/1997 |
| JP | 09-310773 | * 12/1997 |
| JP | 09-310773 A | 12/1997 |
| JP | 3038681 B | 5/2000 |
| JP | 3266985 B2 | 3/2002 |
| JP | 2006-220165 A | 8/2006 |

* cited by examiner

OTHER PUBLICATIONS

International Search Report of PCT/JP2009/062342, mailing date Aug. 4, 2009.

*Primary Examiner* — Peter J Bertheaud
*Assistant Examiner* — Bryan Lettman
(74) *Attorney, Agent, or Firm* — Westerman, Hattori, Daniels & Adrian, LLP

(57) ABSTRACT

A compressor safety valve releases an abnormal pressure to the outside through a discharge port when the pressure in a compressor has increased abnormally. The valve comprises a cap having an anchoring part integrally formed therewith and mounted on a head portion of a valve main body in an attachable and detachable manner. The valve further comprising an elastic body interposingly mounted between the cap and the head portion of the valve main body in a compressed state and in close contact with the head portion of the valve main body. The elastic body is interposed so as to cover the entirety of a peripheral surface of the discharge port and the cap is anchored to the head portion of the valve main body by the elastic repulsive force of the elastic body, so that the discharge port is closed by the elastic body and the cap.

6 Claims, 6 Drawing Sheets

COMPRESSOR SAFETY VALVE

TECHNICAL FIELD

The present invention relates to a compressor safety valve that releases an abnormal pressure externally when the refrigerant pressure within the compressor has increased abnormally.

BACKGROUND ART

A refrigerant compressor for a vehicle air-conditioning apparatus is normally mounted in an engine compartment and is driven by power received from the vehicle engine. Accordingly, the rotation-speed of the compressor depends on the operating state of the vehicle engine, and so the rotation-speed of the compressor may also change drastically following a sudden change in the rotation-speed of the engine, and the refrigerant temperature and pressure in the compressor may be changed drastically. In particular, under severe climatic conditions, there have been cases where the pressure in the compressor increased abnormally. Therefore, for safety reasons, a refrigerant compressor for a vehicle air-conditioning apparatus is provided with a safety valve that releases the abnormal pressure externally when the pressure in the compressor has increased abnormally.

The safety valve is provided so as to communicate with an exhaust pathway in the compressor and is configured such that, when the pressure in the exhaust pathway reaches a set pressure or more, the valve is opened to discharge some of the refrigerant from a discharge port to the outside. However, there is a problem in that since this safety valve is exposed to a severe environment in the engine compartment, the refrigerant, into which oil has being mixed, is released from the safety valve, and white smoke is formed when the refrigerant contacts a high-temperature body, such as the engine, thereby staining the devices in the engine compartment. There has been a risk that the valve is blocked by the discharge port becoming clogged with foreign matter such as mud and sand, or the valve is stayed in a constantly-opened state by the discharge port becoming jammed with foreign matter and so forth.

Thus, proposed that a cap that covers the discharge port is attached to the safety valve, and the cap is provided with a guide port for releasing the refrigerant discharged from the discharge port in a specific direction (see PTL 1); a safety valve is provided with an attachable and detachable cover, an elastic body is interposed between this cover and a valve main body, and the elastic body is provided with a groove having a starting end facing the discharge port and a terminal end reaching the outer edge to form a gas discharge flow path, and further, the terminal end part of the groove of the elastic body is provided with a labyrinth (see PTL 2); and so forth.
{Citation List}
{Patent Literature}
{PTL 1}
Publication of Japanese Patent No. 3266985
{PTL 2}
Publication of Japanese Patent No. 3038681

SUMMARY OF INVENTION

Technical Problem

The configuration in PTL 1 is effective as a countermeasure for avoiding the refrigerant from turning into white smoke when released, because the direction in which the refrigerant is released can be controlled. However, it is difficult to shut out foreign matter from intruding into the discharge port, and it has not been possible to solve the problems such as blockage of the valve due to foreign matter such as mud and sand, or loss of the valve function due to jamming with foreign matter, and so forth.

In PTL 2, since a groove is provided in the elastic body to form a gas discharge flow path, and a labyrinth is further provided in the outlet thereof, it is possible to control the releasing direction of the refrigerant, and one effect can be expected that intrusion of foreign matter such as sand into the discharge port can be prevented. However, since the labyrinth is a thin film of an elastic body, it was difficult to expect a sufficient effect of preventing the intrusion of foreign matter such as sand. Furthermore, since it is necessary to provide a groove in the elastic body for controlling the releasing direction of the refrigerant, the thickness of the elastic body becomes thick. Consequently, the size of the safety valve in the vertical direction becomes great, and there has been a problem in that it is difficult to secure space for installing the cap.

The present invention has been conceived in light of the circumstances described above, and an object thereof is to provide a highly reliable compressor safety valve that is capable of maintaining the valve function over a long period of time by reliably preventing the intrusion of foreign matter into a discharge port.

Solution to Problem

In order to solve the problem described above, the compressor safety valve of the present invention employs the following solutions.

The compressor safety valve according to a first aspect of the present invention is configured such that a discharge port, which communicates with an exhaust pathway in the compressor opens at a head portion of a valve main body, and an abnormal pressure is released to the outside through the discharge port when the pressure in the compressor has increased abnormally; the compressor safety valve includes a cap that has an anchoring part integrally formed therewith by bending and that is mounted on the head portion of the valve main body in an attachable and detachable manner through the anchoring part, and an elastic body that is interposed between the cap and the head portion of the valve main body in a compressed state and that is in close contact with the head portion of the valve main body; the elastic body is interposingly mounted so as to cover the entirety of a peripheral surface of the discharge port and the cap is anchored to the head portion of the valve main body by the elastic repulsive force of the elastic body, and the discharge port is closed by the elastic body and the cap.

According to the above-mentioned aspect, the cap that is mounted in the head portion of the valve main body in an attachable and detachable manner, and the elastic body that is interposed between the cap and the head portion of the valve main body in a compressed state and that is in close contact with the head portion of the valve main body are provided. The elastic body is interposingly mounted so as to cover the entire peripheral surface of the discharge port, and the cap is anchored to the head portion of the valve main body by the elastic repulsive force of the elastic body, and thereby, the discharge port is closed by the elastic body and the cap. Therefore, when the pressure in the compressor has increased abnormally, it is possible to release the refrigerant discharged from the discharge port to the outside through the gap formed at the contacting surface between the elastic body and the head portion of the valve main body due to a deformation of the elastic body. It is possible to completely shut out foreign matter such as sand that tends to intrude into the discharge port from the outside by means of the cap and the elastic body. Therefore, it is possible to maintain the function of the safety valve over a long period of time, and it is possible to obtain a highly reliable safety valve that is capable of reliably preventing blockage of the valve due to the intrusion of foreign matter such as sand, or preventing the valve from staying in the constantly-opened state due to jamming with foreign matter that has intruded, and so forth. Since the thickness of the elastic body can only be about a few millimeters, and furthermore, since the elastic body is interposed in a compressed state, even when the elastic body is interposed, the size of the safety valve in the vertical direction does not become so great, and therefore, the cap can easily be mounted even in a small installation space.

The compressor safety valve according to the second aspect of the present invention is configured such that the discharge port, which communicates with the exhaust pathway in the compressor, opens at the head portion of the valve main body, and an abnormal pressure is released to the outside through the discharge port when the pressure in the compressor is increased abnormally; the compressor safety valve includes the cap that has the anchoring part integrally formed by bending and that is mounted on the head portion of the valve main body in an attachable and detachable manner through the anchoring part, and a C-shaped elastic body that is interposed between the cap and the head portion of the valve main body in a compressed state and that is in close contact with the head portion of the valve main body; the elastic body is interposingly mounted so as to cover a peripheral surface of the discharge port, and the cap is anchored to the head portion of the valve main body by the elastic repulsive force of the elastic body, and a shielding part is provided on the cap so as to face the opening of the C-shaped elastic body and to cover the exit of the opening.

According to the above-mentioned aspect, the cap that is mounted on the head portion of the valve main body in an attachable and detachable manner, and the C-shaped elastic body that is interposed between the cap and the head portion of the valve main body in a compressed state and that is in close contact with the head portion of the valve main body are provided. The elastic body is interposingly mounted so as to cover a peripheral surface of the discharge port, and the cap is anchored to the head portion of the valve main body by the elastic repulsive force of the elastic body; and the shielding part is provided on the cap so as to face the opening of the C-shaped elastic body and to cover the exit of the opening. Therefore, when the pressure in the compressor has increased abnormally, it is possible to release the refrigerant discharged from the discharge port to the outside through the opening of the C-shaped elastic body. It is possible to shut out foreign matter such as sand that tends to intrude into the discharge port from the outside by means of the shielding part that is provided on the cap so as to cover the exit of the opening of the C-shaped elastic body. Therefore, it is possible to maintain the function of the safety valve over a long period of time, and it is possible to obtain a highly reliable safety valve that is capable of reliably preventing blockage of the valve due to the intrusion of foreign matter such as sand, or preventing the valve from staying in the constantly-opened state due to jamming with foreign matter that has intruded, and so forth. Since the thickness of the elastic body can only be about a few millimeters, and furthermore, since the elastic body is interposed in a compressed state, even when the elastic body is interposed, the size of the safety valve in the vertical direction does not become so great, and therefore, the cap can easily be mounted even in a small installation space. Furthermore, it is possible to control the release direction of the refrigerant by arranging the C-shaped elastic body such that the opening thereof faces a specific direction.

In the aspect described above, in any of the compressor safety valves described above, at least the cap of the cap and the elastic body may have a hexagonal shape that is the same shape as the head portion of the valve main body, which is hexagonal bolt-shaped.

According to the configuration described above, since at least the cap of the cap and the elastic body has a hexagonal shape that is the same shape as the hexagonal bolt-shaped head portion of the valve main body, it is not necessary to ensure an extra space around the head portion of the valve main body to which the cap is mounted, and the cap and the elastic body, which have the same shape, can be matched to the valve main body, so as to facilitate the mounting thereof. Therefore, assembly of the cap and the elastic body into the valve main body can be made easier. The elastic body may have the same hexagonal shape as the cap, since the elastic body is deformable, the elastic body is not necessarily in a hexagonal shape.

According to the aspect described above, in the compressor safety valves described above, the anchoring parts may be provided on the two mutually opposing sides of the hexagonal cap.

According to the configuration described above, since the anchoring parts are provided only in the two mutually opposing sides of the hexagonal shaped cap, at the places other than the vicinity of the two sides on which the anchoring parts are provided, the pressing force against the elastic body due to the cap is slightly lower and the elastic body is more easily deformed. Therefore, the refrigerant can be released outside more easily when the refrigerant is discharged from the discharge port, and it is possible to ensure the function of the safety valve sufficiently even if the discharge port is closed.

According to the aspect described above, in the compressor safety valves described above, the cap may be formed, by bending, integrally with holding strips that hold the elastic body on a plurality of sides other than the two sides on which the anchoring parts are provided.

According to the configuration described above, since the holding strips that hold the elastic body are integrally formed by bending at a plurality of sides of the cap other than the two sides on which the anchoring parts are provided, it is possible to hold the elastic body with these plurality of holding strips and to prevent the elastic body from falling off. Thus, it is possible to surely hold the elastic body between the cap and the head portion of the valve main body and to completely prevent the intrusion of foreign matter such as sand into the discharge port.

According to the aspect described above, in any of the compressor safety valves described above, the elastic body may be mounted and fixed on the cap via an adhesive or an adhesive tape.

According to the configuration described above, since the elastic body is mounted and fixed on the cap via an adhesive or an adhesive tape, it is possible to integrate the cap and the elastic body easily and to increase the holding force of the elastic body that is interposed between the cap and the head portion of the valve main body. Thus, it is possible to prevent separation or displacement of the elastic body when the refrigerant is discharged from the discharge port.

According to the aspect described above, in any of the compressor safety valves described above, the elastic body may be made of a foam that uses ethylene propylene rubber (EPM) or ethylene propylene diene rubber (EPDM) as the base material.

According to the configuration described above, since the elastic body is made of a foam that uses ethylene propylene rubber (EPM) or ethylene propylene diene rubber (EPDM) as the base material, it is possible to take advantage of the superior properties of EPM and EPDM used as the elastic body for the safety valve, such as heat resistance, weather resistance, cold resistance, oil resistance, refrigerant resistance, and so forth. By making EPM and EPDM into a foam, it is possible to impart adequate elasticity. Therefore, it is possible to provide the optimal elastic body having both a function of releasing the refrigerant and a function of preventing the intrusion of foreign matter.

Advantageous Effects of Invention

According to the safety valve of the present invention, when the pressure in the compressor has increased abnormally, it is possible to release the refrigerant discharged from the discharge port to the outside through the gap formed at the contacting surface between the elastic body and the head portion of the valve main body due to deformation of the elastic body. Since it is possible to completely shut out foreign matter such as sand that tends to intrude into the discharge port from the outside by means of the cap and the elastic body, it is possible to maintain the function of the safety valve over a long period of time, and it is possible to obtain a highly reliable safety valve that is capable of reliably preventing blockage of the valve due to the intrusion of foreign matter such as sand, or preventing the valve from staying in the constantly-opened state due to jamming with foreign matter that has intruded, and so forth. Since the thickness of the elastic body can only be about a few millimeters, and furthermore, since the elastic body is interposed in a compressed state, even when the elastic body is interposed, the size of the safety valve in the vertical direction does not become so great, and therefore, the cap can easily be mounted even in a small installation space.

According to the safety valve of the present invention, when the pressure in the compressor has increased abnormally, it is possible to release the refrigerant discharged from the discharge port to the outside through the opening of the C-shaped elastic body. Since it is possible to shut out foreign matter such as sand that tends to intrude into the discharge port from the outside by means of the shielding part that is provided on the cap so as to cover the exit of the opening of the C-shaped elastic body, it is possible to maintain the function of the safety valve over a long period of time, and it is possible to obtain a highly reliable safety valve that is capable of reliably preventing blockage of the valve due to the intrusion of foreign matter such as sand, or preventing the valve from staying in the constantly-opened state due to jamming with foreign matter that has intruded, and so forth. Since the thickness of the elastic body can only be about a few millimeters, and furthermore, since the elastic body is interposed in a compressed state, even when the elastic body is interposed, the size of the safety valve in the vertical direction does not become so great, and therefore, the cap can easily be mounted even in a small installation space. Furthermore, it is possible to control the release direction of the refrigerant by arranging the C-shaped elastic body such that the opening thereof faces a specific direction.

DESCRIPTION OF EMBODIMENTS

Embodiments according to the present invention will be described below with reference to the drawings.

[First Embodiment]

A first embodiment of the present invention will be described below with reference to FIGS. 1 to 5.

Figure 1:
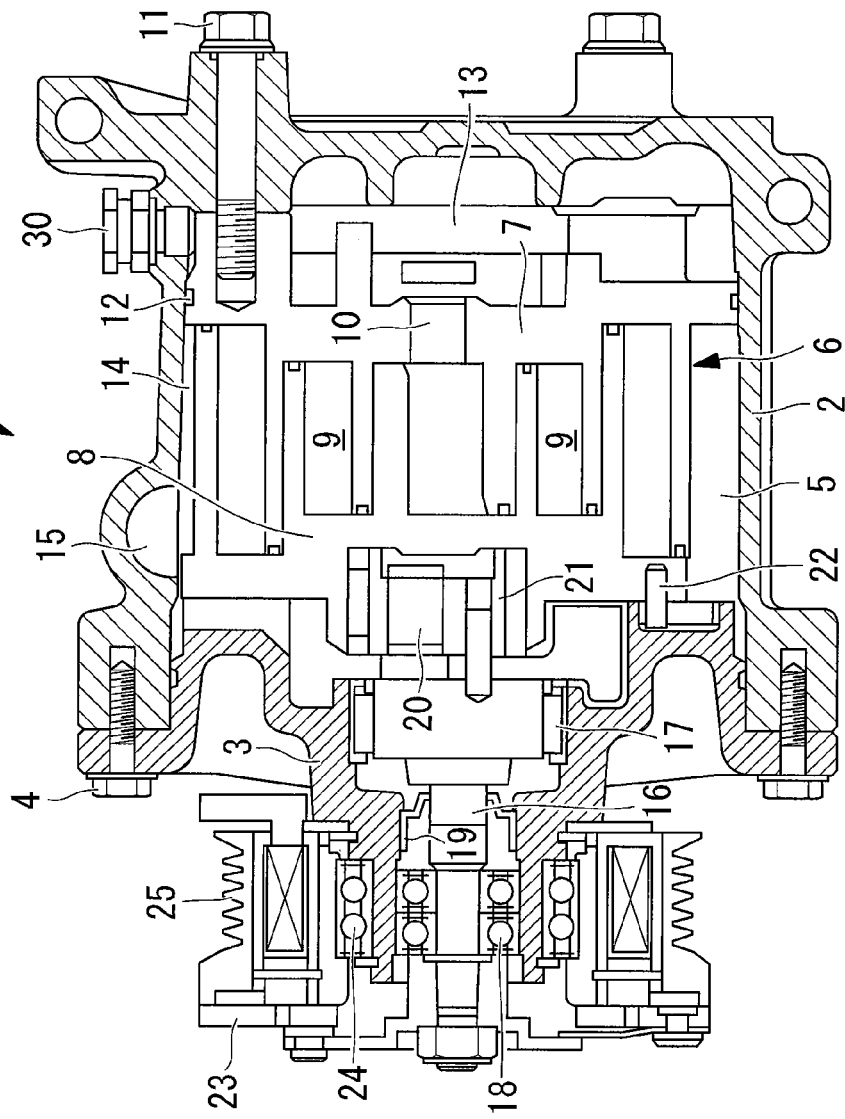
FIG. 1 is a longitudinal cross-sectional view of a scroll compressor provided with a compressor safety valve according to a first embodiment of the present invention.
Figure 2:
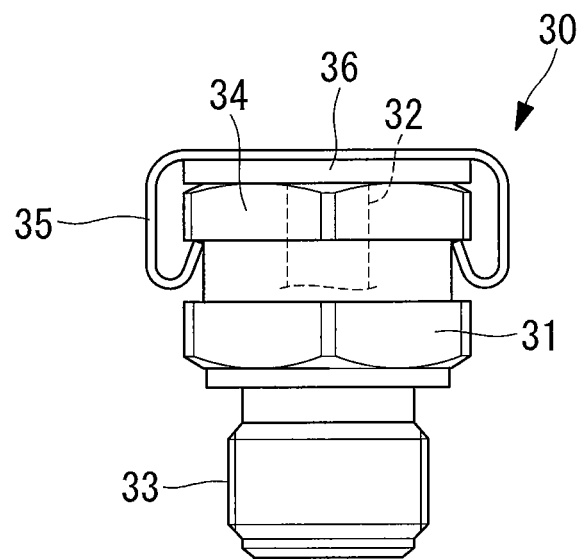
FIG. 2 is an exterior view of the compressor safety valve shown in FIG. 1.
Figure 3:
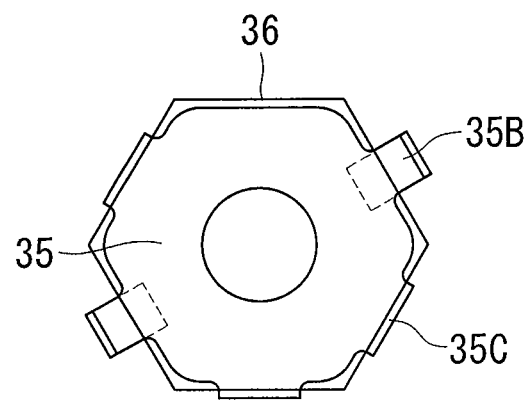
FIG. 3 is a top view of the compressor safety valve shown in FIG. 2.

FIG. 1 shows a longitudinal cross-sectional view of a scroll compressor employing a compressor safety valve according to the first embodiment of the present invention, FIG. 2 shows an exterior view of the compressor safety valve, and FIG. 3 shows a top view thereof.

As shown in FIG. 1, the scroll compressor (compressor) 1 applied to a vehicle air-conditioning apparatus is provided with an aluminum die-cast outer casing 2. This outer casing 2 is formed in a cup-shape having one open end, and a bearing case 3 is fixed to the open end of the outer casing 2 by being fastened with bolts 4, thereby forming a sealed space 5 therein.

A scroll compression mechanism 6 is assembled in the sealed space 5. As is widely known, the scroll compression mechanism 6 is one in which a pair of compression chambers 9 is formed between a fixed scroll member 7 and revolving scroll member 8 pair by engaging both scroll members 7 and 8 with a 180-degree phase shift therebetween, and is configured such that the refrigerant is compressed by moving the compression chambers 9 from the outer peripheral position towards the center, thereby reducing the volume gradually. The fixed scroll member 7 has a discharge port 10 that discharges the compressed gas at the central part and is fixedly mounted on the bottom wall surface of the outer casing 2 by the bolts 11. The revolving scroll member 8 is mounted so as to be driven in an orbitally revolving manner, with a prescribed revolving radius, relative to the fixed scroll member 7 by a drive mechanism, described below.

The fixed scroll member 7 is provided with an O-ring 12 at the outer periphery of an end plate thereof, and the O-ring 12 is in close contact with the inner peripheral surface of the outer casing 2. Thus, the interior of the sealed space 5 is partitioned into an exhaust chamber 13 and an intake chamber 14 through the O-ring 12. The exhaust chamber 13 is configured such that the discharge port 10 is opened so as to discharge high-temperature high-pressure gas from the compression chambers 9 into the exhaust chamber 13 and such that the compressed gas is delivered towards the refrigeration cycle side via the exhaust chamber 13. An inlet port 15 provided in the outer casing 2 opens to the intake chamber 14 thereby taking in a low pressure refrigerant gas which has been circulated through the refrigeration cycle to the intake chamber 14, and the refrigerant gas is sucked into the compression chambers 9 via this intake chamber 14.

In the bearing case 3, a crankshaft 16 is rotatably supported by bearings 17 and 18 and a lip seal 19. One end of the crankshaft 16 is provided with an eccentric pin 20, and the revolving scroll member 8 is connected to the eccentric pin 20 through a drive bush 21, and thereby, the revolving scroll member 8 is configured so as to be driven revolvingly. A rotation preventing mechanism 22 is provided between the thrust-bearing surface of the bearing case 3 and the back surface of the end plate of the revolving scroll member 8 to prevent rotation of the revolving scroll member 8. Thus, the revolving scroll member 8 is configured so as to be driven in an orbitally revolving manner relative to the fixed scroll member 7.

The other end of the crankshaft 16 protrudes outside from the bearing case 3, and the axial end thereof is provided with an electromagnetic clutch 23. The scroll compressor 1 is configured so as to be driven ON and OFF by disconnecting and connecting the motive force transferred through a belt from the vehicle engine (not shown) with this electromagnetic clutch 23 in between a pulley 25 rotatably supported through a bearing 24 on the outer periphery of the bearing case 3 and the crankshaft 16.

The scroll compressor 1 is configured such that, when a current is passed through the electromagnetic clutch 23, the motive force is input to the crankshaft 16 from the pulley 25 through the electromagnetic clutch 23, and thereby, the revolving scroll member 8, which is connected to the crankshaft 16 via the eccentric pin 20 and the drive bush 21, is driven around the fixed scroll member 7 in an orbitally revolving manner. Thus, the refrigerant gas sucked into the intake chamber 14 from the refrigeration cycle via the inlet port 15 is taken into the compression chambers 9. This refrigerant is compressed by the reduction in volume resulting from the revolving movement of the compression chambers 9 towards the center, is discharged into the exhaust chamber 13 via the discharge port 10 provided in the central part of the fixed scroll member 7, and is then delivered to the refrigeration cycle.

The scroll compressor 1 is provided with the safety valve 30 for releasing the abnormal pressure to the outside when operated under severe conditions and when the internal pressure has increased abnormally. The safety valve 30 is provided so as to communicate with the exhaust chamber 13, which forms the exhaust pathway, by passing through the outer casing 2, and as shown in FIGS. 2 and 3, is provided with a hexagonal bolt-shaped valve main body 31. The valve main body 31 has a known configuration, in which a discharge port 32 that penetrates in the axial direction is provided in the center of the valve main body 31, and a valve piece that opens and closes the discharge port 32 and a spring that biases the valve piece in the closing direction are accommodated in the valve main body 31. The safety valve 30 is provided with a threaded part 33 so as to be attached to the threaded hole on the outer casing 2 side.

Figure 4A:
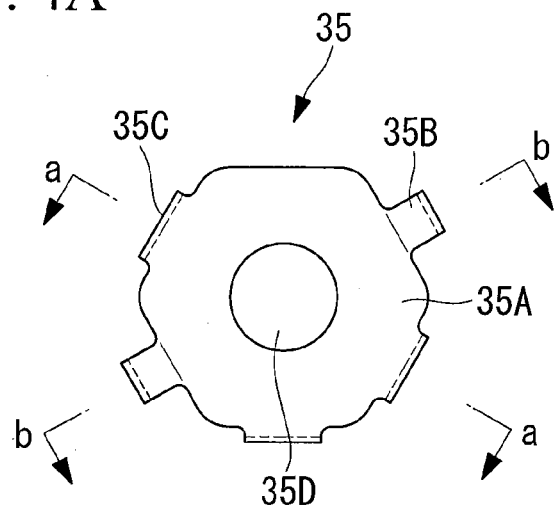
FIG. 4A is a plan view of a cap used in the compressor safety valve shown in FIG. 2.
Figure 4B:
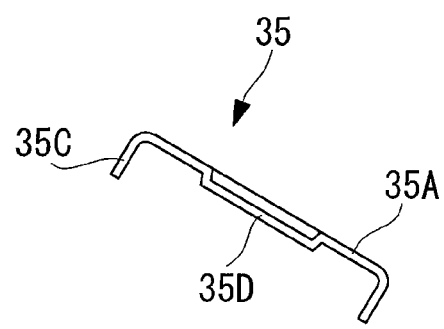
FIG. 4B is a view corresponding to a cross-section along a-a of a cap used in the compressor safety valve shown in FIG. 2.
Figure 4C:
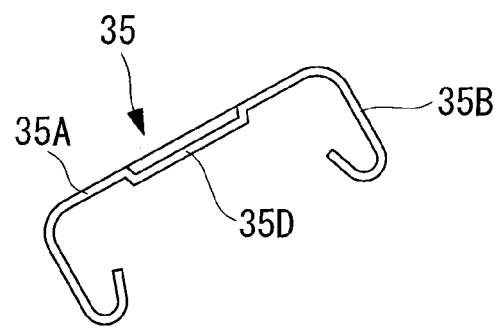
FIG. 4C is a view corresponding to a cross-section along b-b of a cap used in the compressor safety valve shown in FIG. 2.

A cap 35 is mounted on a head portion 34 of the hexagonal valve main body 31 of the safety valve 30 in an attachable and detachable manner, and an elastic body 36 is interposed between this cap 35 and the head portion 34. As shown in FIG. 4, the cap 35 is provided with a lid 35A with the same hexagonal shape as the head portion 34; anchoring parts 35B that are integrally formed by bending at the two opposing sides of the lid 35A so that the tip ends thereof that are attachably and detachably anchored against the head portion 34 of the valve main body 31 are bent in a U-shape; holding strips 35C that are integrally formed by bending at the other three sides other than the two sides on which the anchoring parts 35B are provided and that hold the elastic body 36; and a protrusion 35D that is provided in a convex shape in the central part of the inner surface side of the lid 35A and that positions the elastic body 36. The remaining one side of the hexagonal shape is a connection part for press forming a plurality of caps 35 simultaneously, is a part that is cut after completion of the molding, and is a non-occupied side.

Figure 5A:
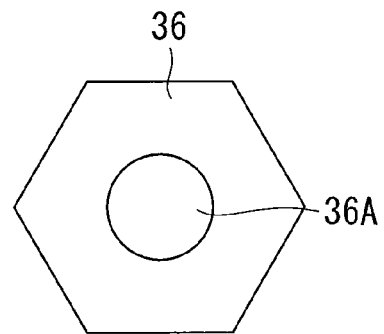
FIG. 5A is a plan view of an elastic body used in the compressor safety valve shown in FIG. 2.
Figure 5B:
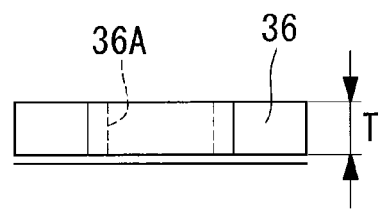
FIG. 5B is a side view of an elastic body used in the compressor safety valve shown in FIG. 2.

As shown in FIG. 5, the elastic body 36 has a hexagonal shape so as to be received inside the holding strips 35C on the three sides of the cap 35, is provided with a punched hole 36A in the central part for positioning, and is capable of being adhered to the inner surface side of the cap 35 by an adhesive, double-sided adhesive tape, or the like. This elastic body 36 is formed of a foam that uses ethylene propylene rubber (EPM) or ethylene propylene diene rubber (EPDM) as a base material, and the thickness T thereof is about a few millimeters (for example, about 3 mm), so that the elastic body 36 has sufficient flexibility and elasticity.

By mounting the cap 35 onto the head portion 34 of the valve main body 31, the elastic body 36 is interposed between the lid 35A of the cap 35 and the head portion 34 of the valve main body 31 in a compressed state, and the elastic body 36 is interposingly mounted in close contact with the head portion 34 so as to cover the entire periphery of the discharge port 32 that opens to the head portion 34. The cap 35 is configured such that the anchoring parts 35B are anchored to the head portion 34 of the valve main body 31 by the elastic repulsive force of the elastic body 36. Thus, the configuration includes the discharge port 32 that is covered by the elastic body 36 so as to be in a closed state by means of the elastic body 36 and the cap 35.

With the configuration described above, the following advantages are afforded according to this embodiment.

When the scroll compressor (compressor) 1 is operated under severe conditions and the pressure within the discharging cavity 13 has increased abnormally and reached the set pressure of the safety valve 30 or more, the safety valve 30 is opened. Some of the high-pressure refrigerant is thereby released to the outside through the discharge port 31, preventing damage and so forth to the scroll compressor 1 due to the abnormal pressure. As the pressure in the scroll compressor 1 is decreased, the safety valve 30 is reset by the pressure of the spring and is closed.

Here, although the entire peripheral surface of the discharge port 32 of the safety valve 30 is covered by the elastic body 36 interposed between the lid 35A of the cap 35 and the head portion 34 of the valve main body 31 and is in the closed state, the elastic body 36 is elastically deformed by the pressure of the refrigerant discharged from the discharge port 32, and a gap is formed between the head portion 34 and the surface of the elastic body 36 in close contact therewith, and thus, the refrigerant can be released to the outside through this gap. Therefore, the scroll compressor 1 can be protected by reducing the abnormal pressure, and even if the discharge port 32 is configured as to be closed by the elastic body 36 and the cap 35, it is possible to assuredly retain the function of the safety valve 30.

Furthermore, since the configuration includes the discharge port 32 of the safety valve 30 that is closed by the elastic body 36 and the cap 35, it is possible to completely shut out foreign matter such as mud and sand that tends to intrude into the discharge port 32 from the outside by means of the cap 35 and the elastic body 36. Therefore, it is possible to obtain a highly reliable safety valve 30 that is capable of maintaining the function of the safety valve 30 over a long period of time, and that is capable of reliably preventing blockage of the valve due to the intrusion of foreign matter, or preventing the valve from staying in the constantly-opened state due to jamming with intruded foreign matter, and so forth. Since the thickness of the elastic body 36 can only be a few millimeters (for example 3 mm), because the elastic body 36 is interposed in a compressed state, even when the elastic body 36 is interposed, the size of the cap 35 in the vertical direction does not become so great, and therefore, the cap 35 can easily be mounted even in a small installation space.

Since the cap 35 and the elastic body 36 are both formed in a hexagonal shape that is the same shape as that of the hexagonal bolt-shaped head portion 34 of the valve main body 31, it is not necessary to ensure an extra space around the head portion 34 of the valve main body 31 on which the cap 35 is mounted, and the cap 35 and the elastic body 36, which have the same shape, can be matched to the valve main body 31, so as to facilitate the mounting thereof. Therefore, the assembly of the cap 35 and the elastic body 36 into the valve main body 31 can be made easier.

The anchoring parts 35B for mounting the cap 35 on the valve main body 31 in an attachable and detachable manner are provided only on two mutually opposing sides of the hexagonal cap 35. Thus, at the places other than the vicinity of the two sides on which the anchoring parts 35B are provided, the pressing force against the elastic body 36 due to the lid 35A is slightly lower and the elastic body 36 is more easily deformed. Thus, the refrigerant can be released outside more easily when the refrigerant is discharged from the discharge port 32, and it is possible to ensure the function of the safety valve 30 sufficiently even if the discharge port 32 is closed.

Furthermore, since the holding strips 35C that hold the elastic body 36 are integrally formed by bending at the three sides of the cap 35 other than the two sides on which the anchoring parts 35B are provided, it is possible to hold the elastic body 36 with these plurality of holding strips 35C and to prevent the elastic body 36 from falling off. Therefore, it is possible to reliably hold the elastic body 36 between the cap 35 and the head portion 34 of the valve main body 31 and to completely prevent the intrusion of foreign matter such as sand into the discharge port 32.

In this embodiment, the elastic body 36 is mounted and fixed by being adhered on the inner surface of the cap 35 with an adhesive or a double-sided adhesive tape. Thus, it is possible to integrate the cap 35 and the elastic body 36 easily and to increase the holding force of the elastic body 36 that is interposed between the cap 35 and the head portion 34 of the valve main body 31. Therefore, it is possible to prevent separation or displacement of the elastic body 36 when the refrigerant is discharged from the discharge port 32.

Since the elastic body 36 is made of a foam that uses ethylene propylene rubber (EPM) or ethylene propylene diene rubber (EPDM) as the base material, it is possible to take advantage of the superior properties of EPM and EPDM, such as heat resistance, weather resistance, cold resistance, oil resistance, refrigerant resistance, and so forth, for the elastic body 36 for the safety valve 30. In addition, by making EPM and EPDM into a foam, it is possible to impart adequate elasticity. Therefore, it is possible to provide the optimal elastic body 36 having both a function of releasing the refrigerant and a function of preventing the intrusion of foreign matter.

In this embodiment, since the cap 35 is provided with the protrusion 35D for positioning the elastic body 36, and the elastic body 36 is provided with the punched hole 36A for positioning, it is possible to assemble the elastic body 36 with precise positioning and to improve the ease of assembly. Since the holding strips 35C are provided on three sides of the hexagonal cap 35, it is possible to assemble the elastic body 36 at the proper position even if the protrusion 35D and the punched hole 36A are omitted. In this embodiment, although the elastic body 36 has the same hexagonal shape as the cap 35, since the elastic body 36 can be deformed freely, the elastic body 36 does not need to have a hexagonal shape.

[Second Embodiment]

Figure 6:
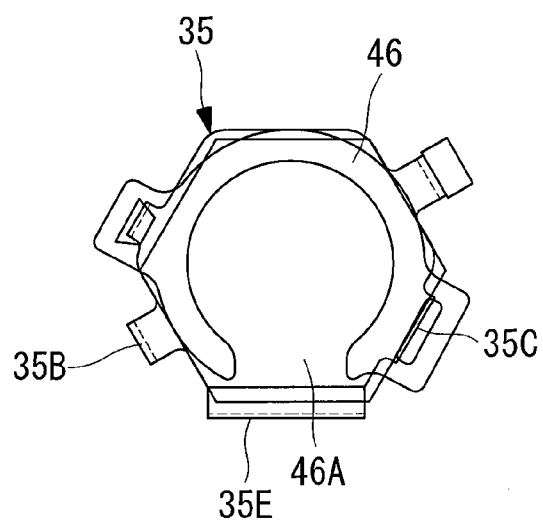
FIG. 6 is a top view of the compressor safety valve according to a second embodiment of the present invention.
Figure 7A:
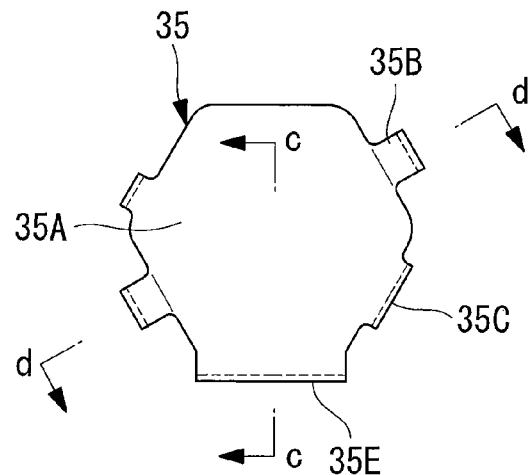
FIG. 7A is a plan view of a cap used in the compressor safety valve shown in FIG. 6.
Figure 7B:
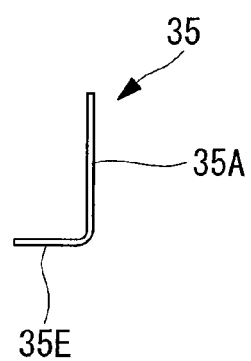
FIG. 7B is a view corresponding to a cross-section along c-c of a cap used in the compressor safety valve shown in FIG. 6.
Figure 7C:
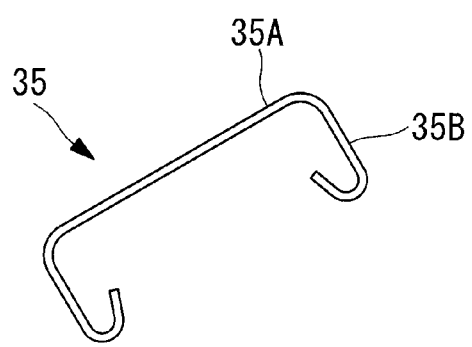
FIG. 7C is a view corresponding to a cross-section along d-d of a cap used in the compressor safety valve shown in FIG. 6.

Next, a second embodiment of the present invention will be described with reference to FIGS. 6 to 8.

This embodiment differs from the first embodiment described above in that the elastic body 46 takes a C-shape and, corresponding to this, a shielding part 35E is provided on the cap 35 side. Other points are the same as those of the first embodiment, and therefore, descriptions thereof are omitted.

Figure 8:
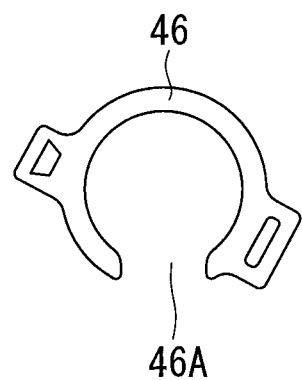
FIG. 8 is a plan view of an elastic body used in the compressor safety valve shown in FIG. 6.

In this embodiment, as shown in FIG. 8, the elastic body 46 interposed between the head portion 34 of the valve main body 31 and the lid 35A of the cap 35 takes a C-shape with an opening 46A formed at a part thereof.

The elastic body 46 is configured so as to be interposingly mounted, in a compressed state, between the head portion 34 of the valve main body 31 and the lid 35A of the cap 35, in a state where the elastic body 46 covers the peripheral surface of the discharge port 32 that opens to the head portion 34 of the valve main body 31, and the opening 46A faces a specific direction. The shielding part 35E that shields the exit of the opening 46A is integrally formed by bending at the one side of the hexagonal shape of the cap 35 so as to face the opening 46A of this elastic body 46. In this embodiment, the protrusion 35D for positioning of the cap 35 is omitted.

According to this embodiment, it is possible to release the refrigerant discharged from the discharge port 32 of the safety valve 30 to the outside through the opening 46A of the C-shaped elastic body 46 when the pressure in the scroll compressor (compressor) 1 has increased abnormally. In addition, it is possible to shut out foreign matter such as mud and sand that tends to intrude into the discharge port 32 from the outside, by means of the shielding part 35E that covers the exit of the opening 46A of the C-shaped elastic body 46 which is provided on the cap 35.

Therefore, also in this embodiment, similarly to the first embodiment, it is possible to maintain the function of the safety valve 30 over a long period of time, and it is possible to obtain a highly reliable safety valve 30 that can reliably prevent blockage of the valve due to the intrusion of foreign matter such as mud and sand, or prevent the valve from staying in the constantly-opened state due to jamming with intruded foreign matter, and so forth. Since the thickness of the elastic body 46 can only be about a few millimeters, and furthermore, because the elastic body 46 is interposed in a compressed state, even when the elastic body 46 is interposed, the size of the safety valve 30 in the vertical direction does not become so great, and the cap 35 can easily be mounted even in a small installation space.

Since the elastic body 46 according to this embodiment is the C-shaped elastic body 46, by mounting the elastic body 46 such that the opening 46A thereof faces a specific direction, it is possible to control the releasing direction of the refrigerant, and therefore, it is also possible to expect a white smoke prevention effect.

The present invention is not limited to the invention according to the embodiments described above; suitable modifications are possible so long as they do not depart from the spirit of the invention. For example, in the embodiments described above, although examples in which the compressor safety valve is applied to the scroll compressor 1 are described, the compressor to which it is applied may be a compressor of any type. Although the position for installing the safety valve may be any position as long as the position communicates with the exhaust pathway (the exhaust chamber) in the compressor, it is needless to say that a position where the mountability of the compressor is not affected and the released refrigerant does not cause any adverse effect can be suitably selected.

REFERENCE SIGNS LIST

1 scroll compressor (compressor)
13 exhaust chamber
30 safety valve
31 valve main body
32 discharge port
34 head portion
35 cap
35B anchoring part
35C holding strip
35E shielding part
36, 46 elastic body
46A opening

The invention claimed is:

1. A compressor safety valve configured such that a discharge port, which communicates with an exhaust pathway in a compressor, opens at a head portion of a valve main body, and an abnormal pressure is released to an outside through the discharge port when a pressure in the compressor has increased abnormally, the compressor safety valve comprising:

a cap that has an anchoring part integrally formed therewith as a bent portion of the cap and that is mounted on the head portion of the valve main body in an attachable and detachable manner through the anchoring part; and an elastic body that is interposed between the cap and the head portion of the valve main body in a compressed state and that is in close contact with the head portion of the valve main body;

wherein the elastic body is interposingly mounted so as to cover an entirety of a peripheral surface of the discharge port; the cap is anchored to the head portion of the valve main body by an elastic repulsive force of the elastic body; and the discharge port is closed by the elastic body and the cap.

2. The compressor safety valve according to claim 1, wherein at least a portion of the cap and the elastic body has a hexagonal shape that is the same shape as the head portion of the valve main body, which is hexagonal bolt-shaped.

3. The compressor safety valve according to claim 2, wherein the anchoring part comprises two anchoring parts provided on two mutually opposing sides of the hexagonal shaped cap.

4. The compressor safety valve according to claim 3, wherein the cap further comprises integrally formed holding strips that hold the elastic body on a plurality of sides other than the two sides on which the anchoring parts are provided.

5. The compressor safety valve according to claim 1, wherein the elastic body is mounted and fixed in the cap via an adhesive or an adhesive tape.

6. The compressor safety valve according to claim 1, wherein the elastic body is made of a foam that uses ethylene propylene rubber (EPM) or ethylene propylene diene rubber (EPDM) as a base material.

\* \* \* \* \*